UNITED STATES PATENT OFFICE.

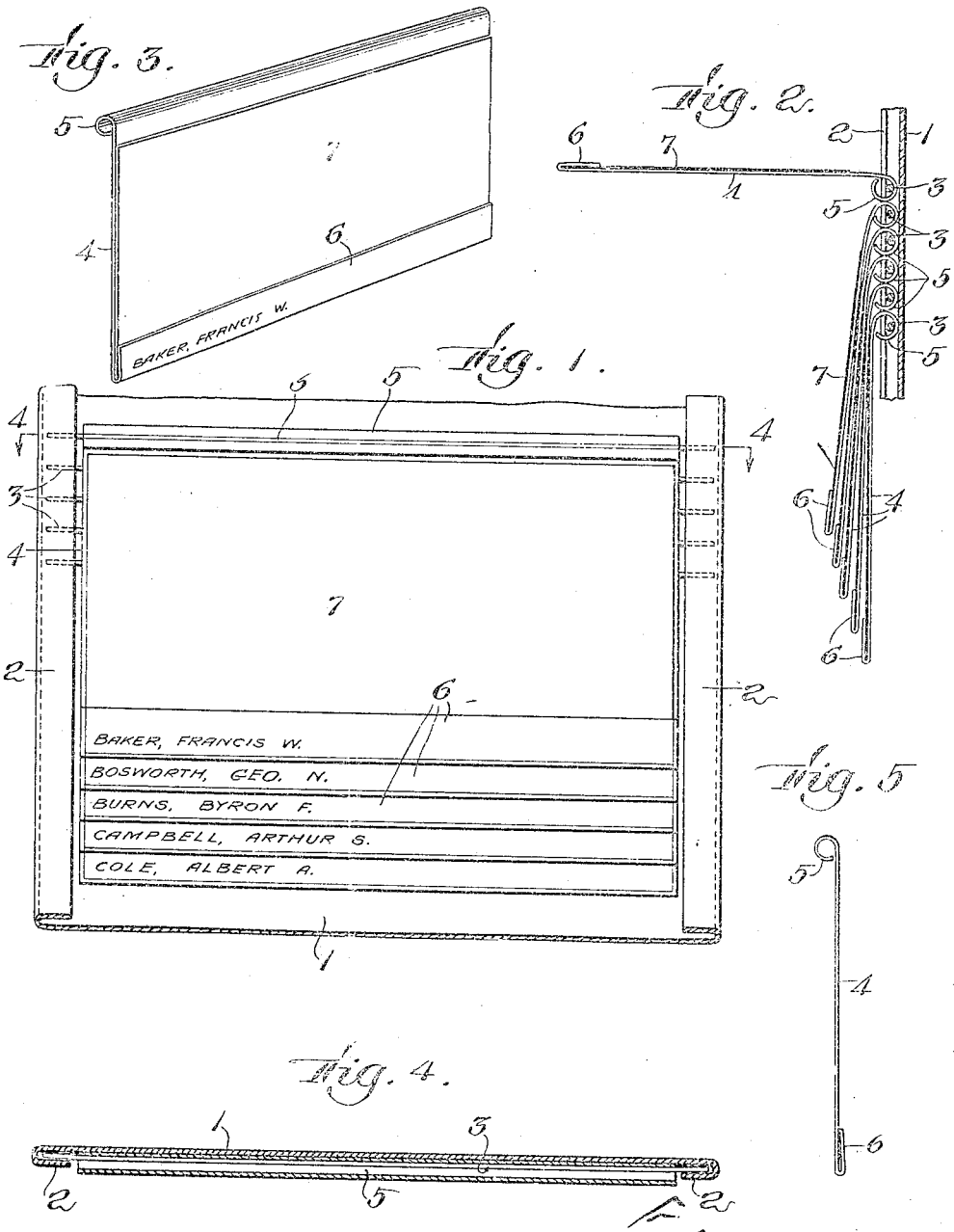

JAMES H. RAND, OF NORTH TONAWANDA, NEW YORK.

INDEX.

1,286,405.

Specification of Letters Patent.  Patented Dec. 3, 1918.

Application filed April 13, 1918. Serial No. 229,253.

*To all whom it may concern:*

Be it known that I, JAMES H. RAND, a citizen of the United States of America, and resident of North Tonawanda, in the county of Niagara and State of New York, have invented new and useful Improvements in Indexes, of which the following is a specification.

This invention relates to indexes of the overlapping card, visible index type, so called, in which the cards or sheets are supported in a frame in overlapped relation with their margins exposed to view for indexing purposes.

In indexes of this kind where the cards or index members have been attached to bars or rails mounted in a frame, the bars or rails have heretofore served as the spacing means as well as the supports for the cards. This required bars of special construction and of proper transverse dimensions to insure the proper spacing of the cards. In the present device the spacing means are parts of the index elements themselves, and the means for holding the index elements in the frame may be simply small rods or lengths of wire since they have no spacing function to perform. This results in simplicity and cheapness of construction and at the same time affords an exceptionally effective index device.

In the accompanying drawings which illustrate the invention,—

Figure 1 is a front view of part of an index containing the invention;

Fig. 2 is a vertical section thereof;

Fig. 3 is a perspective view of one of the index elements;

Fig. 4 is a section on line 4—4 of Fig. 1; and

Fig. 5 is a vertical section of one of the index elements.

The frame or panel 1 may be made as usual of sheet metal with inwardly turned flanges 2, 2, forming opposed channels, in which are inserted the ends of resilient wire rods 3, by which the index elements are held in the frame. The channels of the frames are shallow from front to back and hold the rods 3 quite snugly against the back of the frame. They need be of only such depth as to receive the ends of the wire rods 3 with sufficient freedom to permit the rods to slide lengthwise of the frame when the sheet index elements extend between the rods and the back of the frame. Being resilient the rods will hold the index elements with a gentle but sufficiently firm pressure against the back of the frame.

Each index element of the series comprises a body 4 of sheet material, such as sheet celluloid, having at one edge a roll 5, forming a tubular structure through which the wire rod 3 extends. The roll 5 is preferably offset to the rear of the plane of the body 4, as shown, so that when the parts are assembled, with the several rolls engaging one another the bodies of the cards or index elements may extend from the front sides of the rolls substantially flatwise of the frame. The transverse dimensions of the rolls 5 greatly exceed the diameters of the rods 3, and the several rolls when mounted on the rods, and engaging one another, constitute spacers holding the overlapped index elements in spaced relation with their free margins exposed or projecting one beyond another. The rolls 5 are preferably substantially cylindrical in form and are adapted to hold the index elements in spaced relation in all positions thereof as the index elements are swung forward away from the frame. Similarly the rods 3 will remain substantially stationary in their proper spaced positions as the index elements are swung on their hinges, since the rods are held by the narrow channels close to the back of the frame, and the rolls, when the index elements are swung away from the frame, will slip between the rods and the frame. The rolls 5 being much larger than the rods, and bearing one against another, will space the index elements with relation one to another quite independently of the small rods, and will perform this function in all positions.

The index element is preferably made integrally of a single sheet of celluloid with the roll 5 formed by bending over one margin. The opposite or free margin may be folded to form a trough or pocket 6, to hold a card insert or other sheet 7 on which the desired records may be inscribed. The insert 7 may bear a name or other identifying title on its exposed or projecting margin, in position to be visible through the transparent pocket 6.

The body of the index element may be made of paper, cardboard, or other suitable material instead of sheet celluloid, and the inscriptions could be placed directly on the body 4 instead of on an insert. Even if the body 4 is not made of sheet celluloid however, it is very desirable that the roll 5 should be of sheet celluloid or some equivalent material to insure a roll or tube of sufficient stiffness to bear the weight or pressure to which spacers are subjected in such an index, and of sufficient smoothness and sufficiently frictionless properties to slip freely both against adjacent rolls and behind the rods.

I claim:

1. An index comprising a frame having opposed channels, a series of rods whose ends are inserted in said channels, and a series of overlapped swinging index elements on said rods each having a roll at one edge through which one of the rods extends, the several rolls engaging one another and constituting spacers holding said index elements in spaced relation with their free margins projecting one beyond another.

2. An index comprising a frame having opposed channels, a series of resilient wire rods whose ends are inserted in said channels, and a series of overlapped swinging index elements on said rods each having a roll at one edge through which one of the rods extends, the several rolls engaging one another and constituting spacers holding said index elements in spaced relation with their free margins projecting one beyond another.

3. An index comprising a frame having opposed channels, a series of rods whose ends are inserted in said channels, and a series of overlapped swinging index elements of sheet material on said rods each having a roll integrally formed at one edge through which one of the rods extends, the several rolls engaging one another and constituting spacers holding said index elements in spaced relation with their free margins projecting one beyond another.

4. An index comprising a frame having opposed channels, a series of rods whose ends are inserted in said channels, and a series of overlapped swinging index elements on said rods each having a roll of sheet celluloid at one edge through which one of the rods extends, the several rolls engaging one another and constituting spacers holding said index elements in spaced relation with their free margins projecting one beyond another.

5. An index comprising a frame having opposed channels, a series of rods whose ends are inserted in said channels, and a series of overlapping index elements of sheet material on said rods, each having a roll at one edge, offset to the rear of the plane of the body of the index element, the rods extending through said rolls, and the several rolls engaging one another and constituting spacers holding said index elements in spaced relation with their free margins projecting one beyond another.

6. An index comprising a frame having opposed channels, a series of rods whose ends are inserted in said channels, and a series of overlapped swinging index elements on said rods each having a roll at one edge through which one of the rods extends, the several rolls engaging one another and constituting spacers adapted in all positions of the swinging index elements to hold said index elements and rods in spaced relation.

7. An index comprising a frame having opposed channels, a series of rods whose ends are inserted in said channels, and a series of overlapped swinging index elements on said rods each having a roll at one edge through which one of the rods extends, the transverse dimensions of the rolls greatly exceeding the transverse dimensions of the rods, and the several rolls engaging one another and spacing the index elements with relation one to another independently of the rods.

8. An index comprising a frame having opposed channels, a series of rods whose ends are inserted in said channels, and a series of overlapped swinging index elements on said rods each having a roll of substantially cylindrical form at one edge through which one of the rods extends, the several rolls engaging one another and constituting spacers adapted in all positions of the swinging index elements to hold said index elements and rods in spaced relation.

9. An index comprising a frame having opposed channels, a series of resilient wire rods whose ends are inserted in said channels, and a series of overlapping sheet celluloid index elements on said rods, each formed with a roll at one edge offset to the rear of the body of the index element, the rods extending through said rolls, and the transverse dimensions of the rolls greatly exceeding the diameters of the wire rods, whereby the several rolls will space the index elements with relation one to another in all positions thereof independently of the rods.

Signed by me at Boston, Massachusetts, this twelfth day of April, 1918.

JAMES H. RAND.